US008731181B2

United States Patent
Fan (10) Patent No.: US 8,731,181 B2
(45) Date of Patent: May 20, 2014

(54) COMPUTER TELEPHONY INTEGRATION DEVICE AND RESOURCE MANAGEMENT METHOD AND INCOMING CALL CONTROL METHOD

(75) Inventor: Zhanhua Fan, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 81 days.

(21) Appl. No.: 13/257,995

(22) PCT Filed: Apr. 27, 2010

(86) PCT No.: PCT/CN2010/072263
§ 371 (c)(1),
(2), (4) Date: Nov. 30, 2011

(87) PCT Pub. No.: WO2010/142171
PCT Pub. Date: Dec. 16, 2010

(65) Prior Publication Data
US 2012/0069987 A1    Mar. 22, 2012

(30) Foreign Application Priority Data
Jun. 10, 2009    (CN) .......................... 2009 1 0203745

(51) Int. Cl.
*H04M 3/00*     (2006.01)
*H04M 5/00*     (2006.01)
(52) U.S. Cl.
USPC ..................................................... 379/266.01
(58) Field of Classification Search
USPC .............. 379/265.02, 266.04, 265.05, 266.01
See application file for complete search history.

(56) References Cited

U.S. PATENT DOCUMENTS

| 5,563,941 | A  | * | 10/1996 | Stademann | ............... 379/266.01 |
| 6,687,241 | B1 | * | 2/2004  | Goss      | .............................. 370/352 |
| 6,813,636 | B1 | * | 11/2004 | Bean et al. | ..................... 709/226 |
| 6,937,715 | B2 | * | 8/2005  | Delaney   | .................... 379/265.09 |
| 8,160,234 | B2 | * | 4/2012  | Diethorn  | ................... 379/265.11 |
| 2001/0040887 | A1 |   | 11/2001 | Shtivelman et al. | |

FOREIGN PATENT DOCUMENTS

| CN | 101079928 A   | 11/2007 |
| CN | 101227632 A   | 7/2008  |
| EP | 1237347 A2    | 9/2002  |
| JP | 2002077403 A  | 3/2002  |
| KR | 20030009562 A | 1/2003  |
| WO | 9835509 A2    | 8/1998  |

OTHER PUBLICATIONS

International Search Report for PCT/CN2010/072263 dated Jul. 5, 2010.

* cited by examiner

*Primary Examiner* — Sonia Gay
(74) *Attorney, Agent, or Firm* — Ling Wu; Stephen Yang; Ling and Yang Intellectual Property (57) ABSTRACT

A Computer Telecommunication Integration (CTI) device in a call center is disclosed. This device comprises a CTI management module, one or more CTI units and an agent caching pool shared by said CTI units. Said CTI management module is configured to configure and register CTI units, and monitor states of said CTI units. The CTI unit is configured to manage agents which are subordinate to this CTI unit, and select an idle agent which is able to provide services, and return the selection result to said CTI management module. The agent caching pool is configured to cache an identifier of said agent, a state of said agent, and the information of the CTI unit to which said agent is subordinate. The technical scheme also provides a method for managing resources and a method for controlling an incoming call applied to a call center.

20 Claims, 3 Drawing Sheets

COMPUTER TELEPHONY INTEGRATION DEVICE AND RESOURCE MANAGEMENT METHOD AND INCOMING CALL CONTROL METHOD

TECHNICAL FIELD

The present invention relates to the Computer Telecommunication Integration (CTI) device in the IP based Call Center (CC), and particularly, to a Computer Telecommunication Integration device in a Next Generation Call Center (NGCC) and a method for managing resources and a method for controlling an incoming call.

BACKGROUND OF THE RELATED ART

The Call Center is also called as a customer service center, which is an integrated information service system connected with the enterprises as a whole, and this system integrates a plurality of functions, and these functions are based on the computer communication integration technique and sufficiently utilizes the communication network and computer network technique, and is a specialized system which centralizes to process incoming calls of users and initiates a call to contact with users by a group of agents (manual agents or virtual agents) or service representatives of the company. The Call Center is able to provide various services for users such as the telephone, fax and e-mail and so on, and is mainly used for processing the requirements, queries, complaints, suggestions and inquiries and so on about the enterprises raised by users, such as the 10000 in the telecommunication industry, and the 95555 in the finance industry and so on.

SUMMARY OF THE INVENTION

At present, in the Call Center based on the Next Generation Network (NGN) NGCC, the maximum numbers of the online agents and online calls supported by the CTI device are fixed once it is put into operation, which is not convenient for expanding. However, with the development of the telecommunication industry, the capacity and performance requirements for the CTI device are higher and higher. If the existing system requires expanding capacity, the solution generally is implemented by replacing CTI devices and/or software, and the replacing CTI device should have higher memory capacity and processing speed. Besides, since the original device and/or software is replaced, during capacity expansion and upgrade, the operation of the original CTI device in the system is necessarily stopped, which causes the Call Center is unable to operate normally during the upgrade.

One aspect of the present invention is to provide a Computer Telecommunication Integration device in the Call Center, which can dynamically expand the system capacity without affecting the normal operation.

One aspect of the present invention provides a Computer Telecommunication Integration (CTI) device in a Call Center, comprising a CTI management module, one or more CTI units and an agent caching pool shared by the CTI units, wherein:

said CTI management module is configured to: implement configuration and register of said CTI unit, and monitor states of said CTI units; receive a routing request of a call control module, select one CTI unit in a normal state, and send said routing request to said CTI unit; and return a selection result returned by said CTI unit to said call control module;

said CTI unit is configured to: register and report states to said CTI management module, and manage an agent which is subordinate to this CTI unit, and cache an identifier of said agent, a state of said agent, and information of the CTI unit to which said agent is subordinate into said agent caching pool, and update the state of said agent; and according to the routing request of said CTI management module, select an idle agent which is able to provide services, and return the selection result to said CTI management module; and said agent caching pool is configured to: cache the identifier of said agent, the state of said agent, and the information of the CTI unit to which said agent is subordinate.

Said CTI management module is also configured to: complete signaling relay between said call control module and the CTI unit to which a selected agent is subordinate; and said CTI unit is also configured to: complete the signaling relay between said CTI management module and the agent.

Said CTI management module comprises a first management unit and a first selecting unit, wherein said first management unit is configured to: configure the CTI units, and complete register of configured CTI units, and monitor the state of each CTI unit in real-time, and said state at least includes whether the CTI unit is normal; and said first selecting unit is configured to: after receiving the routing request of the call control module, select one CTI unit in the normal state to process said routing request, and send the selection result including the identifier of a selected agent returned by said CTI unit to said call control module, and record the CTI unit to which the selected agent is subordinate.

Said CTI management module further comprises a first forwarding unit, wherein said first forwarding unit is configured to: send incoming call signaling which is sent to the selected agent from said call control module to the CTI unit to which the selected agent is subordinate, and forward a response message returned by said CTI unit to said call control module.

Said CTI unit comprises a registering and reporting unit, a second management unit and a second selecting unit, wherein:

said registering and reporting unit is configured to: register to said CTI management module, and report state information of this CTI unit to the CTI management module in real-time during an operating process;

said second management unit is configured to: take a sign-on agent as the agent which is subordinate to this CTI unit, and cache the identifier of the sign-on agent, the state of the agent, and information of the CTI unit to which the agent is subordinate into said agent caching pool, and update the state of the agent which is subordinate to this CTI unit in said agent caching pool in real-time during an incoming call; and said second selecting unit is configured to: according to said routing request, inquire whether an idle agent which is able to provide services exists in the agent caching pool, and if the idle agent which is able to provide services exists, select the idle agent which is able to provide services and return the selection result including the identifier of the selected agent to said CTI management module; if the idle agent which is able to provide services does not exist, return the selection result of routing failure to said CTI management module.

Said CTI unit further comprises a second forwarding unit, wherein said second forwarding unit is configured to: forward incoming call signaling sent from said CTI management module to the selected agent, and after receiving a response message of the selected agent, directly forward the response message to said CTI management module or send the response message to said CTI management module after converting a protocol format of said response message.

Said second selecting unit is also configured to: send a notification of having selected the agent to said second selecting unit;

said second forwarding unit is also configured to: notify said second management module after a call of the selected agent which is subordinate to this CTI unit ends; and said second management unit is also configured to: set an initial state of the agent in the agent caching pool to an idle state; after obtaining the notification of having selected the agent from said second selecting unit, update the state of the selected agent in the agent caching pool to a kind of a non-idle state; and after finding out that the call of the selected agent which is subordinate to this CTI unit ends from said second forwarding unit, recover the state of the selected agent in the agent caching pool to the idle state.

Said second management unit is also configured to: cache skill information of said agent into said agent caching pool; and said second selecting unit is configured to select the idle agent which is able to provide services according to a following way:

according to information of a skill requirement included in the routing request, selecting one agent of which a skill complies with said skill requirement from idle agents as the idle agent which is able to provide services.

Said second management unit is also configured to: cache priority information of the skill of said agent into said agent caching pool; and said second selecting unit is also configured to: when there are a plurality of idle agents complying with the skill requirement, selecting an agent with high-priority skill according to priority information of skill of the agent.

Said registering and reporting unit is also configured to: send a heartbeat message to said CTI management module, and said heartbeat message includes a load situation of this CTI unit; and said CTI management module is also configured to: according to a receiving situation of said heartbeat message, judge whether a corresponding CTI unit is normal and record the load situation of the CTI unit; and said CTI management module is configured to select one CTI unit in the normal state according to a following way:

said CTI management module selecting one CTI unit with lowest load from the CTI units in the normal state.

The above Computer Telecommunication Integration (CTI) device has a hierarchical structure and uses the modularized CTI unit to manage agents, and is able to implement to expand the capacity of the CTI device by dynamically increasing CTI units. Thus, not only the cost is saved, but also there isn't any effect on the normal operations of the original CTI units, and the normal operation of the system is ensured during expanding the capacity and upgrade.

Another aspect of the present invention also provides a method for managing resources applied to a call center, said call center comprises a call control module, a Computer Telecommunication Integration (CTI) device and a plurality of agents, said CTI device comprises a CTI management module, one or more CTI units and an agent caching pool, and said method comprises:

the CTI management module configuring and registering the CTI unit, monitoring whether a state of the CTI is normal;

said CTI unit managing agents which are subordinate to this CTI unit, caching an identifier of said agent, a state of said agent, and information of the CTI unit to which said agent is subordinate into the agent caching pool, and updating the state of agents;

after receiving a routing request of the call control module, said CTI management module selecting one CTI unit in a normal state;

said CTI unit in the normal state inquiring whether an idle agent which is able to provide services in said agent caching pool exists, and if existing, returning a selection result including the identifier of a selected agent to said CTI management module; and said CTI management module returning said selection result to the call control module and recording the CTI unit to which the selected agent is subordinate.

In the step of caching into the agent caching pool, said CTI unit also caches skill information of agents which are subordinate to this CTI unit into said agent caching pool; and in the step of selecting one CTI unit in the normal state, said CTI unit selects one agent of which a skill complies with a skill requirement from idle agents in the agent caching pool as the idle agent which is able to provide services according to information of said skill requirement included in the routing request.

Said CTI unit sends a heartbeat message to said CTI management module, and said heartbeat message includes a load situation of this CTI unit; and said CTI management module judges whether a corresponding CTI unit is normal according to a receiving situation of said heartbeat message and records the load situation of the CTI unit; and in the step of selecting one CTI unit in the normal state, when said CTI management module selects the CTI unit processing the routing request, one CTI unit with lowest load is selected from the CTI units in the normal state.

Another aspect of the present invention also provides a method for controlling an incoming call applied in a call center, said call center uses the above method for managing resources to carry out management, and said method for controlling the incoming call comprises:

a call control module sending incoming call signaling to a selected agent, and said incoming call signaling being sent to the selected agent through a Computer Telecommunication Integration (CTI) management module and a CTI unit to which the selected agent is subordinate, and a response message of the selected agent being returned to the call control module through the CTI unit to which the selected agent is subordinate and the CTI management module.

Said CTI unit takes a sign-on agent as the agent which is subordinate to this CTI unit, and sets an initial state of agents which are subordinate to this CTI unit in the agent caching pool to an idle state;

after obtaining a selection result that one agent which is subordinate to this CTI unit has been selected through the CTI management module, said CTI unit updates a state of the selected agent in the agent caching pool to a kind of a non-idle state; and after finding out that a call of the selected agent which is subordinate to this CTI unit ends, said CTI unit recovers the state of the selected agent in the agent caching pool to the idle state.

The above method for managing resources and method for controlling an incoming call allocates agents to each relatively independent CTI unit to carry out management, and each CTI unit can share the state information of agents, and during an incoming call, the CTI unit selected by the CTI management module selects the routing, and when the CTI units are dynamically increased, there isn't any negative effect on the normal operations and incoming calls of original CTI units, and the normal operation of the system is ensured during expanding the capacity and upgrade.

PREFERRED EMBODIMENTS OF THE PRESENT INVENTION

The inventive conception of the computer telecommunication integration device, the method for managing resources and the method of controlling an incoming call of the present invention is that this CTI device uses a two-hierarchy management structure and scheduling resources are modularized to be CTI units, and the CTI management module manages each CTI unit, and the CTI unit manages the subordinate agents and completes the specific routing function.

It will present and describe the technical scheme of the present intention with reference to figures and preferable examples in detail below. And the following examples are only used for describing and explaining the present invention, but not for limiting the present invention.

Figure 1:
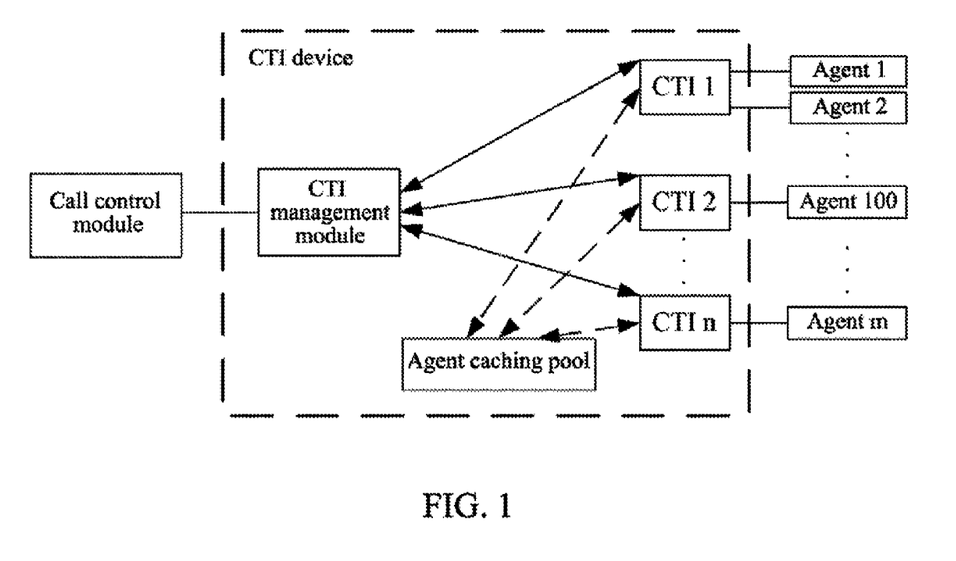
FIG. 1 is a structural block diagram of the next generation network call center comprising the CTI device of the example of the present invention.

FIG. 1 shows the structural block diagram of the call center, which comprises a call control module and a CTI device connected with each other, and a plurality of agents connected to the CTI device.

The call control module is configured to send a routing request to the CTI device after receiving a call of the user; and according to the routing selection result, call the selected agent, send a ringing event to the CTI device, and forward a response message of the selected agent returned by the CTI device to the user, thereby setting up the call.

A plurality of agents are respectively subordinate to different CTI units in the CTI device, and the agent is configured to: carry out a response after receiving incoming call signaling (including the ringing event and so on), and send a response message to the CTI unit to which the agent is subordinate, and provide services for users after calling.

The CTI device comprises: a CTI management module, one or more CTI unit CTI 1~CTI n connected with the CTI management module and a agent caching pool shared by each CTI unit, wherein the CTI management module is configured to implement configuration and register of each CTI unit, and monitor the state of each CTI unit in real-time; after receiving a routing request of the call control module, select one CTI unit to complete the selection of the agent and return the result to the call control module; and complete the signaling relay between the call control module and the CTI unit to which the selected agent is subordinate.

This CTI management module comprises:

the first management unit, which is configured to: configure CTI units and complete the register of configured CTI units, and monitor the state of each CTI unit in real-time.

In this way, the capacity expansion of the CTI device can be implemented in a case without affecting the work of other CTI units through configuring the new CTI units and completing the register, and these expanded CTI units are only required to be used by registering without changing the interface of the CTI management module and call control module. In this example, the state of each CTI unit monitored by the management unit in real-time includes information such as whether this CTI unit is normal and the current load situation (including load occupancy rate and so on) and so on, which can be obtained by sending the heartbeat message from the CTI unit to the CTI management module and also can be obtained by actively inquiring the CTI.

The first selecting unit, which is configured to: after receiving the routing request of the call control module, select one CTI unit in a normal state to process this routing request, and send a routing selection result returned by this CTI unit to the call control module and record the CTI unit to which the selected agent is subordinate.

The selection policy of the selecting the CTI unit is described as the following text. Besides, this selecting unit can directly find out the CTI unit to which the selected agent is subordinate from the selection result returned by the CTI unit, and also can inquire to find out the CTI unit to which the selected agent is subordinate from the agent caching pool according to an identifier of the selected agent in this selection result, and so on.

The first forwarding unit, which is configured to: send a ringing event which is sent to the selected agent by the call control module to the CTI unit to which the selected agent is subordinate, and forward the response message returned by the CTI unit to the call control module, wherein this ringing event includes an identifier of the selected agent.

The CTI unit is configured to: register and report states to the CTI management module, manage the agents which are subordinate to this CTI unit, cache information of these agents such as the identifiers, skills, states, and the CTI units to which the agents are subordinate into the agent caching pool and update states of the agents in real-time, according to the routing request of the CTI management module, select an agent which is able to provide services and return a selection result, and complete the signaling relay between the CTI management module and the agent.

This CTI unit comprises:

a registering and reporting unit, which is configured to: register to the CTI management module, and report information such as the load situation of this CTI unit during the operating process. The information can be included in the heartbeat message which is regularly sent to the CTI management module. When the CTI units that the CTI device has already had are overloaded and the CTI device requires expanding CTI units, the new configured CTI units register to the CTI management module after being activated, and after the agents which are subordinate to this CTI unit are signed on to this new configured CTI unit, expanding capacity can be implemented.

The second management unit, which is configured to: accept the sign-on of the agent, and take the sign-on agents as the agents which are subordinate to this CTI unit to carry out management, cache information of the subordinate agents such as the identifiers, skills, states, and the identifiers of the CTI units to which the agents are subordinate and so on into the agent caching pool, and update the state information of the agents which are subordinate to this CTI unit in the cache in real-time during an incoming call. The identifier of the agent can be a job number or a telephone number of the agent and so on, and optionally, the priority information of the agents also can be cached.

The second selecting unit, which is configured to: according to the routing request, inquire the agent caching pool, and if an idle agent which complies with the skill requirements for the agents is selected, return a routing selection result including the identifier of the selected agent and the identifier of the CTI unit to which the selected agent is subordinate to the CTI management module, otherwise return a routing selection result of the routing failure.

When there is a plurality of idle agents complying with the skill requirements, the selection can be carried out in the agents with highest skill priority according to the skill priority information of agents.

At this time, the second management unit is also configured to: cache the skill priorities of the agents into the agent caching pool; and the second selecting unit is also configured to: when there is a plurality of agents complying with the skill requirements, select the agent with the highest skill priority.

The second forwarding unit, which is configured to: forward the ringing event sent from the CTI management module to the selected agent, and after receiving the response message of the selected agent, directly forward the response message to said CTI management module, or send the response message to the CTI management module after converting the protocol format.

The states of agents can include the idle state, selected state, ringing state, and the calling state and so on. When the agent just signs on, the state can be set to "idle". In order to update the state information in real-time, when the second selecting unit selects a agent, the second selecting unit can notify the second management unit, and this second management unit updates the state of the selected agent to "selected"; and after receiving the ringing event sent to the selected agent, the second forwarding unit can notify the second management unit, and this second management unit updates the state of the selected agent to "ringing" (or "non-idle"); and after the subsequent call starts, this second management unit updates the state of the selected agent to "calling" (or "non-idle"), and after finding out that the call of the selected agent ends through the second forwarding unit, recovers the state of the selected agent to "idle". The formulation of states can have many choices, but states are divided into at least two classes of the idle and non-idle, which is convenient for the selection.

The agent caching pool is configured to: cache information of agents such as the identifiers, states, skills and the CTI unit to which the agents are subordinate and so on.

It should be described that in other simpler systems, if the call center does not classify the skill of agents, and the cached information and routing request can exclude the skill information of agents. The methods in following examples are like this.

It can be seen that the CTI device uses a two-hierarchy management structure and modularizes the scheduling resources to be CTI units, and the CTI management module manages the CTI units, and the CTI units manage the subordinate agents and complete the specific routing functions, so that when the existing CTI units of the CTI device are overloaded and the CTI device requires expanding, it is only in need of new configured CTI units and its subordinate agents, and after the subordinate agents sign on to the new configured CTI units and the new configured CTI units completing to register to the CTI management module, the new configured CTI units and its subordinate agents can be used. The operations of the original CTI units and agents do not require stopping.

Based on the above CTI device, the example of the present invention also provides a method for managing resources and a method for controlling the incoming call by CTI device, wherein the method for managing resources comprises:

step one: each CTI unit registers to the CTI management module, and reports information such as the load situation and so on to the CTI management module in real-time during the operation process; and when an agent signs on to one CTI unit, this CTI unit takes the sign-on agent as an agent which is subordinate to this CTI unit, and caches information of the sign-on agent such as the identifier, skill, state, priority and the identifier of the CTI unit to which the sign-on agent is subordinate into the agent caching pool;

the existing CTI units can complete the registration to the CTI management module when the CTI device starts. When the current CTI units of the CTI device are overloaded and are required to expand the capacity, the new configured CTI unit can register to the CTI device after being activated. The initial state of the agent is the idle state.

Step two: after receiving the routing request of the call control module, the CTI management module selects one CTI unit to process this routing request, and if this CTI unit selects one idle agent complying with the skill requirements according to the cached information of each agent, and includes the identifier of the selected agent in the routing selection result which is sent to the CTI management module, and updates the cached states of the selected agent;

in this example, the policy of selecting the CTI unit gives priority to selecting one CTI unit with lowest load occupancy rate from the CTI units in a normal state to select the agent, but in other examples, the policy of selecting the CTI unit uses the polling selection among the CTI units in a normal state, or other selection policies such as the combination of prior selection according to the load with the polling selection and so on can also be adopted. As for the CTI unit selecting the agent, as described above, one agent is selected from the agents which satisfy the skill requirements for the agent in the routing request and are in the idle state.

Preferably, the routing selection result reported to the CTI management module also includes the identifier of the CTI unit to which the selected agent is subordinate, and thus the CTI management module can directly obtain the identifier information of the CTI unit to which the selected agent is subordinate.

Step three: the CTI management module forwards the received routing selection result to the call control module and records the identifier of the CTI unit to which the selected agent is subordinate, and the call control module sends the ringing event which will send to the selected agent to the CTI management module at first, and the CTI management module sends this ringing event to the CTI unit to which the selected agent is subordinate, and this CTI unit sends this ringing event to the selected agent and updates the cached state of the selected agent.

The method for controlling the incoming call using the above method for managing resources to carry out management further comprises:

step four: after receiving the ringing event, the selected agent responds, and sends a response message to the CTI unit to which the selected agent is subordinate, and this CTI unit forwards the response message to the call control module through the CTI management module device after converting the protocol format, and finally forwards the response message to the user, thereby setting up the call.

Figure 2:
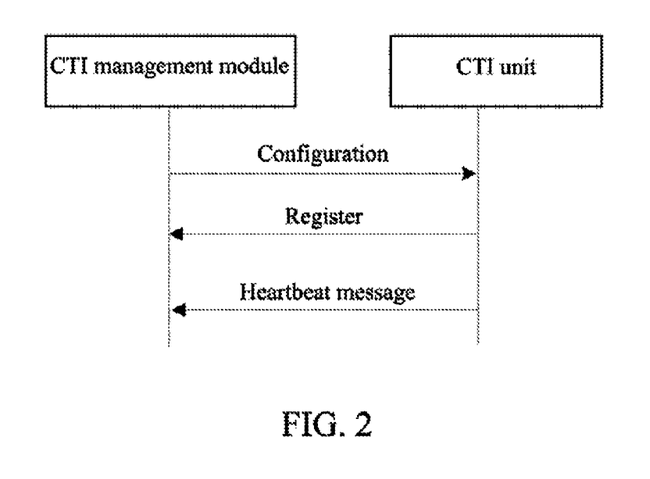
FIG. 2 is a flow chart of dynamically configuring the CTI unit in the method according to the example of the present invention.

The following will give a flow of the application example of the method examples in the method for managing resources and each stage of controlling the incoming call:

the flow of the configuration, register and reporting information of the CTI unit is as shown in FIG. 2, and comprises following steps:

A1: the CTI management module configures the CTI units;

A2: configured CTI units register to the CTI management module;

A3: the CTI unit which completes the register sends a heartbeat message to the CTI management module.

The heartbeat message includes the ID value and the load situation of the CTI unit, and when a fault of a certain CTI unit occurs and the CTI unit is unable to send the heartbeat message, the CTI management module records that this CTI unit is in a fault state.

Figure 3:
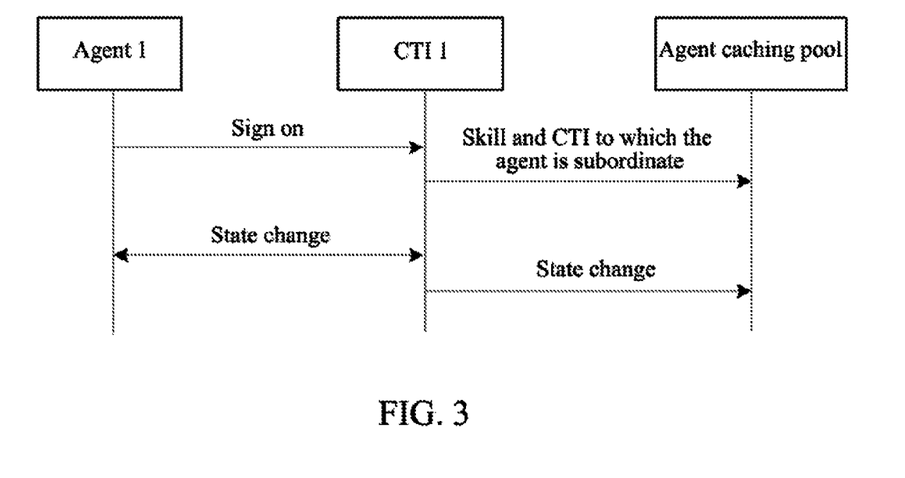
FIG. 3 is a flow chart of agent signing on in the method according to the example of the present invention.

The flow of the agent signing on is as shown in FIG. 3, and comprises following steps:

B1: the agent 1 signs on to the CTI 1 unit, and the CTI 1 unit obtains information of this agent such as the skill and priority and so on;

B2: the CTI 1 unit saves the identifier, skill, priority, the identifier of the CTI 1 unit and the state information of this agent into the agent caching pool;

B3: when the agent actively changes the state or the CTI 1 unit judges that the agent state requires changing during the call control process, the CTI 1 unit saves the changed state of the agent into the agent caching pool.

Figure 4:
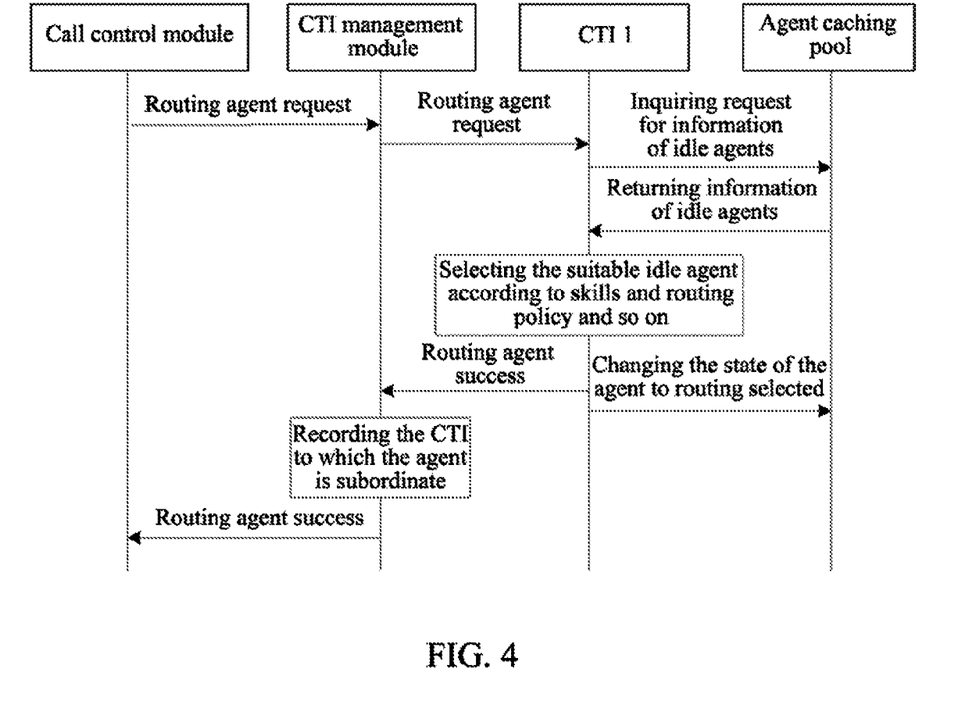
FIG. 4 is a flow chart of routing selecting agent success during an incoming call of user in the method according to the example of the present invention.

The flow of routing selecting agent success during an incoming call of user is shown in FIG. 4, and comprises the following steps:

C1: after an incoming call of the user, the call control module sends a routing request message to the CTI management module;

C2: the CTI management module sends the routing request message to a CTI unit in the normal state and lowest load situation to process it, for example the CTI 1 unit;

C3: the CTI 1 unit determines the user required agent skill according to the contents of the routing request;

C4: the CTI 1 unit inquires all the agents which are in an idle waiting state in the agent caching pool, and reads information of all the idle agents such as the identifiers, skills, priorities and the identifiers of the CTI units to which all the idle agents are subordinate and so on;

C5: the CTI 1 unit selects the most suitable agent complying with the skill requirements according to the routing policy, for example the agent 100 (referring to FIG. 1); and at the same time, returns the routing selection result including the identifier of the agent 100 and the identifier of the CTI unit (for example the CTI 2 unit) to which the agent 100 is subordinate, and the routing agent success message is sent at this time;

C6: the CTI 1 unit modifies the agent state of the agent 100 in the agent caching pool to a routing selected state so as to avoid being selected once again;

C7: the CTI management module records the CTI unit to which this agent 100 is subordinate, namely the CTI 2 unit; and forwards the routing agent success message to the call control module, and the message includes the identifier of the agent 100 such as the telephone number or the job number and so on.

Figure 5:
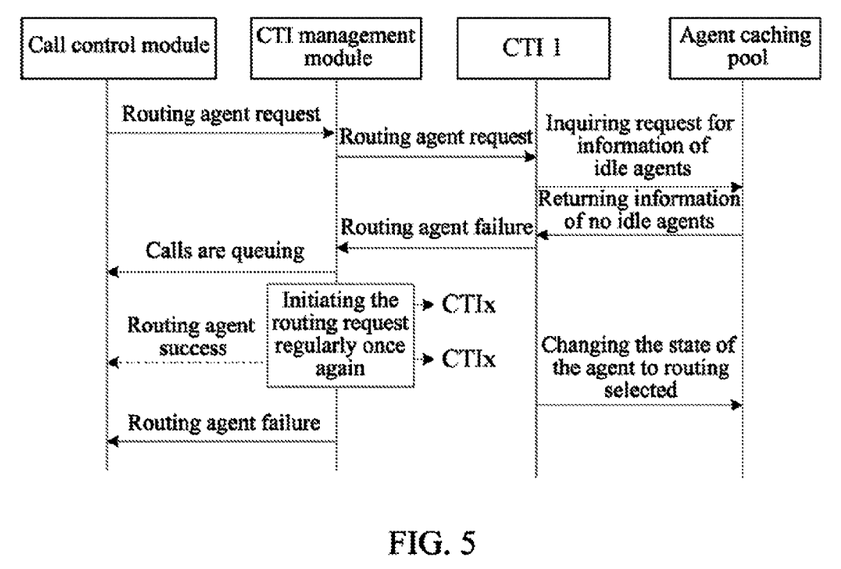
FIG. 5 is a flow chart of routing selecting agent timeout during an incoming call of user in the method according to the example of the present invention.

A flow of routing selecting agent timeout during an incoming call of user is as shown in FIG. 5, which is based on the step after the CTI 1 unit sending inquiring request for information of all the agents in the idle state to the agent caching pool and the agent caching pool returning information of no idle agent existing after searching in the flow shown in FIG. 4, and comprises:

D1: the CTI 1 unit returns a routing agent failure message including information of no idle agent existing to the CTI management module;

D2: the CTI management module notifies the call control module that calls are queuing and are required to wait;

D3: the CTI management module regularly initiates the routing selecting request message over again, and selects the CTI unit which processes this request according to the policy, for example the CTI x;

D4: if the CTI management module receives the routing agent success message sent by the CTI unit in a preset timeout duration, the routing selection in this time ends, and returns a routing agent success message to the call control module, and if an available agent is still not found in the preset timeout duration, returns a routing agent failure message including information of queuing timeout to the call control module.

Figure 6:
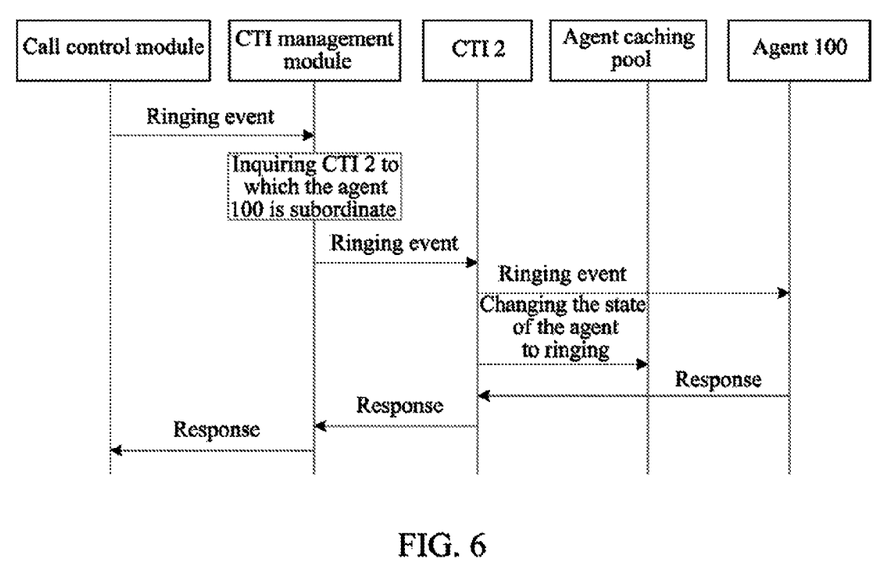
FIG. 6 is a flow chart of the call event in the method according to the example of the present invention.

The flow of the call after selecting the agent is shown in FIG. 6, and comprises following steps:

E1: the call control module calls the agent 100, and the ringing event is sent to the CTI management module at first;

E2: according to the identifier of the agent 100, the CTI management module inquires the CTI unit to which this agent is subordinate, namely the CTI 2 (referring to FIG. 1);

E3: the CTI management module forwards the ringing event to the CTI 2 unit, and the ringing event includes the identifier of the destination device namely the agent 100 to which the ringing event requires sending;

E4: the CTI 2 unit forwards the ringing event to the agent 100, and updates the state of the agent 100 in the agent caching pool to the ringing state;

E5: the agent 100 responds, and sends a response message to the CTI 2 unit, and after converting the protocol format, the CTI 2 unit sends the response message to the call control module through the CTI management module, thereby setting up the call.

In conclusion, the expandable CTI device and corresponding method for managing resources and method for controlling the incoming call provided in the present invention are able to implement to expand the capacity of the CTI device in a way of dynamically increasing CTI units. Thus not only the cost is saved, but also the normal operation of the original devices is not affected, and the normal operation of the system is ensured during expanding the capacity and upgrade.

The above description is the preferred examples of the present invention, which is not used for limiting protection scope of the present invention. The present invention can also illustrates other various examples, and the person skilled in the art can make various corresponding modifications and transformations according to the present invention without departing from the spirit or essence of the present invention, but all the corresponding modifications and transformations shall all fall into the protection scope of the appended claims of the present invention.

INDUSTRIAL APPLICABILITY

The present invention allocates agents to each relatively independent CTI unit to carry out management, and each CTI unit can share the state information of agents, and during an incoming call, the CTI unit selected by the CTI management module selects the routing, and when the CTI units are dynamically increased, there aren't any negative effect on the normal operations and incoming calls of original CTI units, and the normal operation of the system is ensured during expanding the capacity and upgrade.

What is claimed is:

1. A Computer Telecommunication Integration (CTI) device in a call center, comprising a CTI management module, one or more CTI units and an agent caching pool shared by said CTI units, wherein, said CTI device is a device used within one call center; and said CTI device uses a two level hierarchical management structure and modularizes the scheduling resources to one or more CTI units; wherein the CTI management module manages the CTI units, and the CTI units manage the subordinate agents and complete the specific routing functions, so that the CTI device can be expanded with more CTI units without interrupting the operations of the original CTI units and agents;

said CTI management module is configured to: implement configuration and register of said CTI units, and monitor states of said CTI units; receive a routing request of a call control module, and select one CTI unit in a normal state, and send said routing request to said CTI unit; and return a selection result returned by said CTI unit to said call control module;

said CTI unit is configured to: register and report states to said CTI management module, and manage an agent which is subordinate to this CTI unit, and cache an identifier of said agent, a state of said agent, and information of the CTI unit to which said agent is subordinate into said agent caching pool, and update the state of said agent; and according to the routing request of said CTI management module, select an idle agent which is able to provide services from all the idle agents of all the CTI units that are cached in said agent caching pool, and return the selection result to said CTI management module; and said agent caching pool is configured to: cache the identifiers of said agents, the states of said agents, and the information of the CTI units to which said agents are subordinate;

said call center is a Next Generation Network (NGN) based call center implemented in an IP (Internet Protocol) network.

2. The CTI device as claimed in claim 1, wherein said CTI management module is also configured to: complete signaling relay between said call control module and the CTI unit to which a selected agent is subordinate; and said CTI unit is also configured to: complete the signaling relay between said CTI management module and the agent.

3. The CTI device as claimed in claim 1, wherein said CTI management module comprises a first management unit and a first selecting unit, wherein said first management unit is configured to: configure the CTI units, complete register of configured CTI units, and monitor the state of each CTI unit in real-time, and said state at least includes whether the CTI unit is normal; and said first selecting unit is configured to: after receiving the routing request of the call control module, select one CTI unit in the normal state to process said routing request, and send the selection result including the identifier of a selected agent returned by said CTI unit to said call control module, and record the CTI unit to which the selected agent is subordinate.

4. The CTI device as claimed in claim 3, wherein said CTI management module further comprises a first forwarding unit, wherein said first forwarding unit is configured to: send incoming call signaling which is sent to the selected agent from said call control module to the CTI unit to which the selected agent is subordinate, and forward a response message returned by said CTI unit to said call control module.

5. The CTI device as claimed in claim 1, wherein said CTI unit comprises a registering and reporting unit, a second management unit and a second selecting unit, wherein said registering and reporting unit is configured to: register to said CTI management module, and report state information of this CTI unit to the CTI management module in real-time during an operating process;

said second management unit is configured to: take a sign-on agent as the agent which is subordinate to this CTI unit, and cache the identifier of the sign-on agent, the state of the agent, and information of the CTI unit to which the agent is subordinate into said agent caching pool, and update the state of the agent which is subordinate to this CTI unit in said agent caching pool in real-time during an incoming call; and said second selecting unit is configured to: according to said routing request, inquire whether an idle agent which is able to provide services exists in the agent caching pool, and if the idle agent which is able to provide services exists, select the idle agent which is able to provide services and return the selection result including the identifier of the selected agent to said CTI management module; if the idle agent which is able to provide services does not exist, return the selection result of a routing failure to said CTI management module.

6. The CTI device as claimed in claim 5, wherein said CTI unit further comprises a second forwarding unit, wherein said second forwarding unit is configured to: forward incoming call signaling sent from said CTI management module to the selected agent, and after receiving a response message of the selected agent, directly forward the response message to said CTI management module or send the response message to said CTI management module after converting a protocol format of said response message.

7. The CTI device as claimed in claim 6, wherein said second selecting unit is also configured to: send a notification of having selected the agent to said second management unit;

said second forwarding unit is also configured to: notify said second management module after a call of the selected agent which is subordinate to this CTI unit ends; and said second management unit is also configured to: set an initial state of the agent in the agent caching pool to an idle state; after obtaining the notification of having selected the agent from said second selecting unit, update the state of the selected agent in the agent caching pool to a kind of a non-idle state; and after finding out that the call of the selected agent which is subordinate to this CTI unit ends from said second forwarding unit, recover the state of the selected agent in the agent caching pool to the idle state.

8. The CTI device as claimed in claim 7, wherein said second management unit is also configured to: cache skill information of said agent into said agent caching pool; and said second selecting unit is configured to select the idle agent which is able to provide services according to a following way:

according to information of a skill requirement included in the routing request, selecting one agent of which a skill complies with said skill requirement from the idle agents as the idle agent which is able to provide services.

9. The CTI device as claimed in claim 8, wherein said second management unit is also configured to: cache a priority of the skill of said agent into said agent caching pool; and said second selecting unit is configured to select the idle agent which is able to provide services according to a following way:

when there is a plurality of idle agents complying with the skill requirement, selecting the agent with high-priority skill as the idle agent which is able to provide services.

10. The CTI device as claimed in claim 5, wherein said registering and reporting unit is also configured to: send a heartbeat message to said CTI management module, and said heartbeat message includes a load situation of this CTI unit; and said CTI management module is also configured to: according to a receiving situation of said heartbeat message, judge whether a corresponding CTI unit is normal and record the load situation of the CTI unit; and said CTI management module is configured to select one CTI unit in the normal state according to a following way:

said CTI management module selecting one CTI unit with lowest load from the CTI units in the normal state.

11. A method for managing resources applied to a call center, characterized in that said call center is a Next Generation Network (NGN) based call center implemented in an IP (Internet Protocol) network, and comprises a call control module, a Computer Telecommunication Integration (CTI) device and a plurality of agents, and said CTI device comprises a CTI management module, one or more CTI units and an agent caching pool;

said CTI device is a device used within one call center; and said CTI device uses a two level hierarchical management structure and modularizes the scheduling resources to one or more CTI units; wherein the CTI management module manages the CTI units, and the CTI units manage the subordinate agents and complete the specific routing functions, so that the CTI device can be expanded with more CTI units without interrupting the operations of the original CTI units and agents; and said method comprises:

the CTI management module configuring and registering the CTI unit, monitoring whether a state of the CTI unit is normal;

said CTI unit managing the agents which are subordinate to this CTI unit, caching an identifier of said agent, a state of said agent, and information of the CTI unit to which said agent is subordinate into the agent caching pool, and updating the state of agents;

and after receiving a routing request of the call control module, said CTI management module selecting one CTI unit in a normal state;

said CTI unit in the normal state inquiring, from all the idle agents of all the CTI units that are cached in said agent caching pool, whether an idle agent which is able to provide services exists, and if existing, returning a selection result including the identifier of a selected agent to said CTI management module; and said CTI management module returning said selection result to the call control module and recording the CTI unit to which the selected agent is subordinate.

12. The method for managing resources as claimed in claim 11, wherein in the step of caching into the agent caching pool, said CTI unit also caches skill information of agents which are subordinate to this CTI unit into said agent caching pool; and in the step of selecting one CTI unit in the normal state, said CTI unit selects one agent of which a skill complies with a skill requirement from the idle agents in the agent caching pool as the idle agent which is able to provide services according to information of said skill requirement included in the routing request.

13. The method for managing resources as claimed in claim 11, further comprising:

said CTI unit sending a heartbeat message to said CTI management module, and said heartbeat message including a load situation of this CTI unit; and said CTI management module judging whether a corresponding CTI unit is normal according to a receiving situation of said heartbeat message and recording the load situation of the CTI unit; and in the step of selecting one CTI unit in the normal state, when said CTI management module selects the CTI unit processing the routing request, one CTI unit with lowest load being selected from the CTI units in the normal state.

14. A method for controlling an incoming call applied to a call center, characterized in that said call center uses the method for managing resources as claimed in claim 11 to carry out management, and said method for controlling the incoming call comprises:

the call control module sending incoming call signaling to the selected agent, and said incoming call signaling being sent to the selected agent through the Computer Telecommunication Integration (CTI) management module and the CTI unit to which the selected agent is subordinate, and a response message of the selected agent being returned to the call control module through the CTI unit to which the selected agent is subordinate and the CTI management module.

15. The method for controlling the incoming call as claimed in claim 14, further comprising:

said CTI unit taking a sign-on agent as the agent which is subordinate to this CTI unit, and setting an initial state of the agents which are subordinate to this CTI unit in an agent caching pool to an idle state;

after obtaining a selection result that one agent which is subordinate to this CTI unit has been selected through the CTI management module, said CTI unit updating a state of the selected agent in the agent caching pool to a kind of a non-idle state; and after finding out that a call of the selected agent which is subordinate to this CTI unit ends, said CTI unit recovering the state of the selected agent in the agent caching pool to the idle state.

16. The CTI device as claimed in claim 3, wherein said CTI unit comprises a registering and reporting unit, a second management unit and a second selecting unit, wherein said registering and reporting unit is configured to: register to said CTI management module, and report state information of this CTI unit to the CTI management module in real-time during an operating process;

said second management unit is configured to: take a sign-on agent as the agent which is subordinate to this CTI unit, and cache the identifier of the sign-on agent, the state of the agent, and information of the CTI unit to which the agent is subordinate into said agent caching pool, and update the state of the agent which is subordinate to this CTI unit in said agent caching pool in real-time during an incoming call; and said second selecting unit is configured to: according to said routing request, inquire whether an idle agent which is able to provide services exists in the agent caching pool, and if the idle agent which is able to provide services exists, select the idle agent which is able to provide services and return the selection result including the identifier of the selected agent to said CTI management module; if the idle agent which is able to provide services does not exist, return the selection result of a routing failure to said CTI management module.

17. The CTI device as claimed in claim 4, wherein said CTI unit comprises a registering and reporting unit, a second management unit and a second selecting unit, wherein said registering and reporting unit is configured to: register to said CTI management module, and report state information of this CTI unit to the CTI management module in real-time during an operating process;

said second management unit is configured to: take a sign-on agent as the agent which is subordinate to this CTI unit, and cache the identifier of the sign-on agent, the state of the agent, and information of the CTI unit to which the agent is subordinate into said agent caching pool, and update the state of the agent which is subordinate to this CTI unit in said agent caching pool in real-time during an incoming call; and said second selecting unit is configured to: according to said routing request, inquire whether an idle agent which is able to provide services exists in the agent caching pool, and if the idle agent which is able to provide services exists, select the idle agent which is able to provide services and return the selection result including the identifier of the selected agent to said CTI management module; if the idle agent which is able to provide services does not exist, return the selection result of a routing failure to said CTI management module.

18. A method for controlling an incoming call applied to a call center, characterized in that said call center uses the method for managing resources as claimed in claim 12 to carry out management, and said method for controlling the incoming call comprises:

the call control module sending incoming call signaling to the selected agent, and said incoming call signaling being sent to the selected agent through the Computer Telecommunication Integration (CTI) management module and the CTI unit to which the selected agent is subordinate, and a response message of the selected agent being returned to the call control module through the CTI unit to which the selected agent is subordinate and the CTI management module.

19. A method for controlling an incoming call applied to a call center, characterized in that said call center uses the method for managing resources as claimed in claim 13 to carry out management, and said method for controlling the incoming call comprises:

the call control module sending incoming call signaling to the selected agent, and said incoming call signaling being sent to the selected agent through the Computer Telecommunication Integration (CTI) management module and the CTI unit to which the selected agent is subordinate, and a response message of the selected agent being returned to the call control module through the CTI unit to which the selected agent is subordinate and the CTI management module.

20. The CTI device as claimed in claim 16, wherein said CTI unit further comprises a second forwarding unit, wherein said second forwarding unit is configured to: forward incoming call signaling sent from said CTI management module to the selected agent, and after receiving a response message of the selected agent, directly forward the response message to said CTI management module or send the response message to said CTI management module after converting a protocol format of said response message.

* * * * *